Patented June 5, 1923.

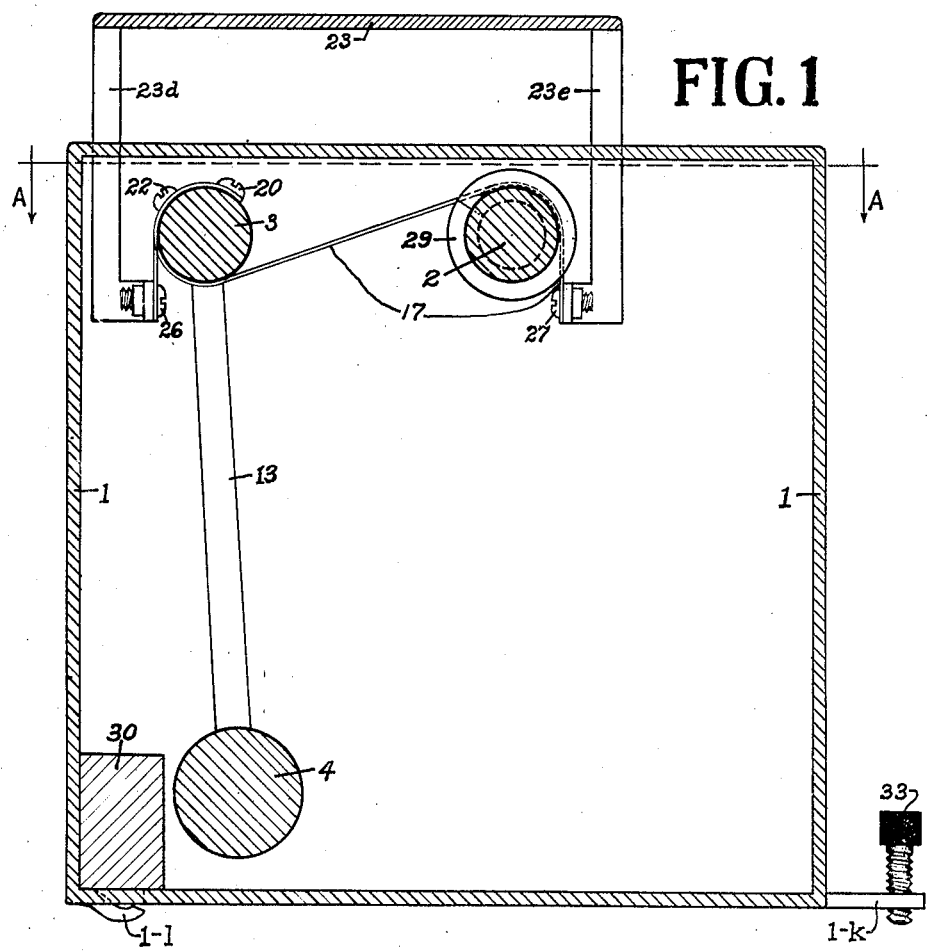

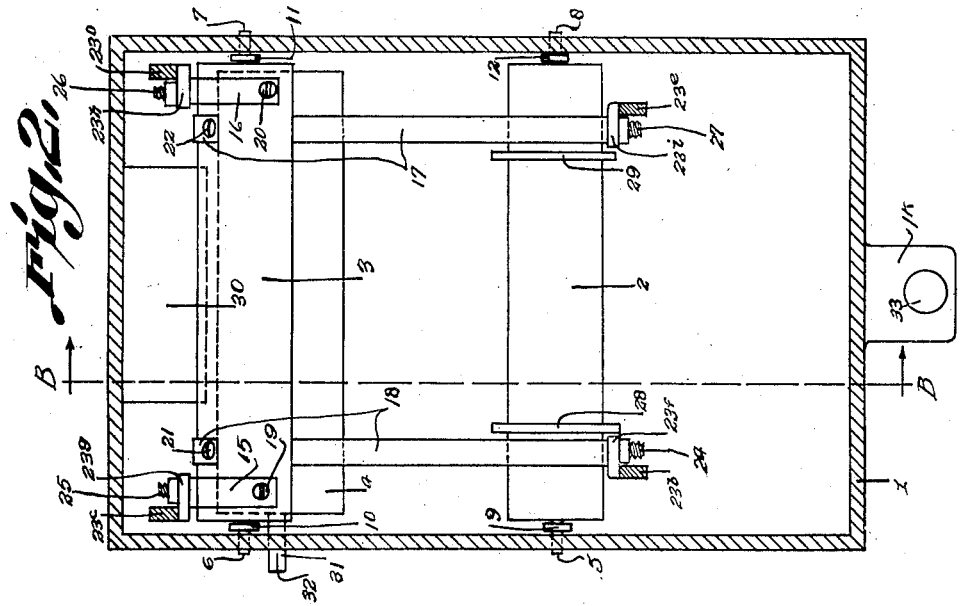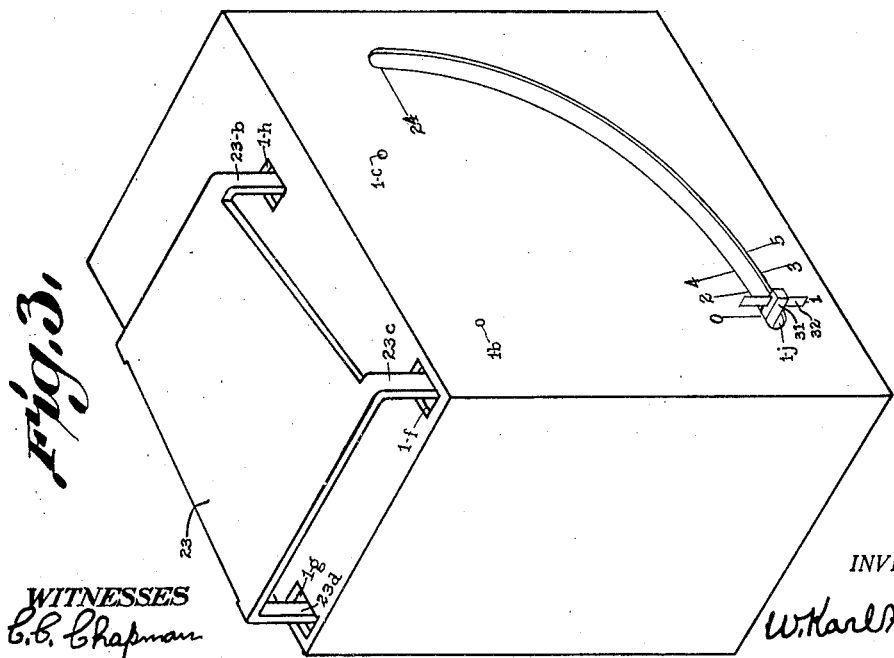

1,457,628

UNITED STATES PATENT OFFICE.

WALTER K. HARRIS, OF LOCKHART, TEXAS.

EQUALIZED-PLATFORM AUTOMATIC SCALE.

Application filed February 6, 1922. Serial No. 534,617.

*To all whom it may concern:*

Be it known that I, WALTER K. HARRIS, a citizen of the United States, residing at Lockhart, in the county of Caldwell and State of Texas, have invented new and useful Improvements in Equalized-Platform Automatic Scales, of which the following is a specification.

My invention pertains to automatic weighing devices, and resides chiefly in an equalized platform of novel construction, as will hereinafter be made clear. The primary object of the invention is to reduce the number and increase the simplicity of the parts and assembly to the point where automatic springless scales with perfectly equalized platforms can be produced at a manufacturing cost in line with the common family non-equalized-platform spring scale, production facilities and size, capacity and appearance of the finished articles being duly considered, thereby enabling housewives to purchase, at a moderate price, an automatic scale which will register accurately upon the dial, regardless of the portion of the platform upon which the article to be weighed is placed, and which will continue to register accurately regardless of climatic changes, use and age.

A further object is to provide an automatic scale capable of passing inspection for legal use in trade, but of such simple construction that they may be manufactured and sold to small grocerymen and tradesmen who have heretofore felt themselves unable to afford an automatic scale capable of passing such inspection for legal use in trade.

A further object is to provide an automatic springless scale which may be made more compactly than other automatic springless scales equipped with arcuate dials, capacity of the scales and scope of dials being duly considered.

A further object is to provide a scale in which the pendulum and indicator are a unit and the platform is supported direct upon the pendulum shaft. Scales in which the platform, pendulum, and indicator are separate units require frequent adjustments to retain perfect co-ordination between these separate parts. No such adjustments will ever be necessary in my scale.

For the purpose of illustrating my equalized platform, I picture in the accompanying drawings only one of the several styles of scales to which same is applicable, this being the simplest form known to me, and what I designate as the "family style." It should be understood that I exhibit such drawings only for the purpose of illustrating my invention, and not as the final or restrictive embodiment thereof, since analysis of the proposition will disclose that the instrumentalities made use of are capable of various modifications in material, form, position, number, etc., and that the method of causing the platform to co-act with the pendulum, spring, or other apparatus used for measuring gravity, may be varied to suit the particular style of scale to which the invention is applied.

Further objects of my invention will appear as the description proceeds. Referring to the drawings:

Figure 1 is a sectional side elevation view, taken on line B—B of Figure 2, looking in the direction of the arrows;

Figure 2 is a plan view taken on line A—A of Figure 1, looking in the direction of the arrows; while Figure 3 is an isometric view of the completed scale (shown on a reduced scale).

Referring to the figures as characters of reference, 1 broadly designates the housing (walls, top and bottom), which may be formed from any suitable material, but preferably from sheet steel. 2 and 3 are seasoned hardwood drums, into the ends of which steel pins 5, 6, 7 and 8 are driven. Said steel pins ride in clean-cut holes $1^b$, $1^c$, in the side walls, the drums being prevented from contacting with said side walls by small copper washers 9, 10, 11 and 12. A weight 4 is attached to the drum 3 through the medium of arms 13 and 14 (14 not shown in drawings). 15, 16, 17 and 18 are limp tapes, one end of each being attached to the drum 3 by round head wood screws 19, 20, 21, and 22. All four tapes pass anti-clock-wise (when viewing the scale from the dial side) down the drum 3, tapes 15 and 16 reaching only slightly below the drum, but 17 and 18 being long enough to continue their course around the drum 3 to a point slightly beyond the lowest longitudinal portion thereof, from whence they continue in a slightly upward direction, eventually passing over the top of drum 2, thence down in a true vertical direction to a point slightly lower than said drum 2.

23 broadly designates the one-piece platform, the legs of which pass through and work freely within openings 1$^f$, 1$^g$, 1$^h$ and 1$^i$, cut into the top plate. At the bottom of said legs, which I designate as 23$^b$, 23$^c$, 23$^d$ and 23$^e$, ears 23$^f$, 23$^g$, 23$^h$ and 23$^i$ project inwardly, forming right angles to said legs. The free ends of said tapes, as well as the before-mentioned ears, are pierced with suitable holes through which stove bolts 24, 25, 26 and 27 pass, thereby furnishing a four-point, swing-like support for the platform. 28 and 29 are split flanges or thin collars, fitted into suitable grooves sawed around the drum 2. Cut into one side wall is an arcuate slot 1$^j$, upon the sides of which are arranged alternately, suitable graduations and numerals. Protruding from the weight 4 and thence through the slot 1$^j$ is a pin 31, into the outer end of which is fitted, at right angles thereto, a thin piece of steel 32. 30 is a rubber bumper, so positioned that the weight 4 barely clears same when the indicator 32 stands at zero. The scale rests upon three points, towit: upon two tongues of metal 1$^L$ and 1$^m$ (1$^m$ not shown in drawings) cut from the bottom plate and turned down, as illustrated, and upon a knurled thumb screw 33, screwed into an extension 1$^k$ of the bottom plate.

The scale is so radically simple that its operation will probably be grasped from a casual inspection of the drawings. It will be observed that the platform is somewhat of a mechanical paradox, inasmuch as same is placed above the parallel drums 2 and 3—yet, is suspended from them by the limp tapes. This reduces friction to such as will be created by the four pins 5, 6, 7 and 8, plus the negligible friction of the limp tapes. It is obvious that pressure exerted upon the platform at any point thereupon will operate to rotate the drum 3 anti-clock-wise by reason of causing the limp tapes to unwind, thereby forcing the weight 4 outwardly and upwardly until it reaches a point which equals the pressure upon the platform. Furthermore, it is absolutely immaterial as to what point upon the platform the article to be weighed is placed, inasmuch as the rotary force exerted upon the drum 3 will be precisely the same in any case. It should also be obvious that the platform will remain in a true horizontal plane as it descends, since each tape will unwind the same amount. As a precaution against the possibility of the right hand end of the platform shifting laterally with respect to the housing, thereby causing the legs 23$^b$ or 23$^c$ to bear against said housing, the split flanges 28 and 29 are provided. The leveling screw 33 furnishes a convenient means for quickly raising or lowering that particular end of the scale, thereby causing the indicator to stand at zero, regardless of the unlevel character of the surface upon which the scale might be placed. A thin strip of steel is used as an indicator, its width being disposed at right angles to the dial and its length being aligned with the pendulum shaft's axis of rotation. By moving one's head until only the front edge of the indicator is visible, the weight of the article can be determined to a fine degree. Alternating the graduations from one side of the slot to the other avoids crowding, the effect thereof being equivalent to doubling the length of the dial.

My invention is capable of many modifications, but the essence thereof is set forth in the claims herewith appended. In the scale I am illustrating no attempt has been made to include the refinements and conveniences which commercial buyers demand. For commercial use the pendulum shaft and parallel bar will be supported upon annular ball bearings or some other style of non-friction bearing, the limp tapes will run inwardly towards the pendulum shaft's axis of rotation in order that the graduations upon the dial may be uniformly spaced, the leveling screw will be so located that a screw driver or wrench will be required for its manipulation, and provision will be made for bringing the indicator to a quick stop. This will be the lowest priced commercial type and especially convenient for use upon a high show case but inconvenient for use upon a counter since, the dial being beneath the platform, it would be necessary to stoop in order to read same. In the arcuate dial counter type the pendulum will be placed in the right hand side of the scale and an indicator arm will extend upwardly therefrom into an indicator housing in a manner familiar to the art. In the cylindrical dial, computing type, the pendulum shaft and parallel bar will be placed at right angles to the line of vision, and a toothed sector extending upwardly from the pendulum shaft will mesh with a small spur wheel on the axle of the computing cylinder.

What I claim is:

1. In a pendulum scale, the combination of a pendulum having a shaft, a partially revoluble bar paralleling the pendulum shaft and lying in an approximately horizontal plane therewith, a platform placed above the pendulum shaft and partially revoluble parallel bar with supports which extend below the axes of said pendulum shaft and parallel bar, suspension tapes between the lower portions of the platform supports and what constitutes the outer portions of the pendulum shaft and parallel bar when said pendulum shaft and parallel bar are considered with relation to one another, and a connection between the pendulum shaft and parallel bar which forces said pendulum shaft and parallel bar to revolve in conjunction in opposite directions when a downward pressure is exerted upon any portion of the platform.

2. In a scale, the combination of two partially revoluble parallel bars lying in an approximately horizontal plane, a platform placed above said parallel bars with supports which extend below the axes thereof, suspension tapes between the lower portions of the platform supports and what constitutes the outer portions of the parallel bars when said parallel bars are considered with relation to one another, a connection between the parallel bars which forces them to revolve in conjunction in opposite directions when a downward pressure is exerted upon any portion of the platform, and a connection between one of the parallel bars and the pendulum used for measuring gravity which transmits to such gravity-measuring device the motion set up in said parallel bars by reason of a downward pressure exerted upon the platform.

In testimony whereof I affix my signature in the presence of two subscribing witnesses.

WALTER K. HARRIS.

Witnesses:
 W. W. HARRIS,
 F. C. MORSE.